April 3, 1951  C. C. AIKEN  2,547,729
PACKAGE HANDLING APPARATUS
Filed Jan. 9, 1946  2 Sheets-Sheet 1

INVENTOR
Chester C. Aiken
BY
ATTORNEY

April 3, 1951 C. C. AIKEN 2,547,729
PACKAGE HANDLING APPARATUS
Filed Jan. 9, 1946 2 Sheets-Sheet 2
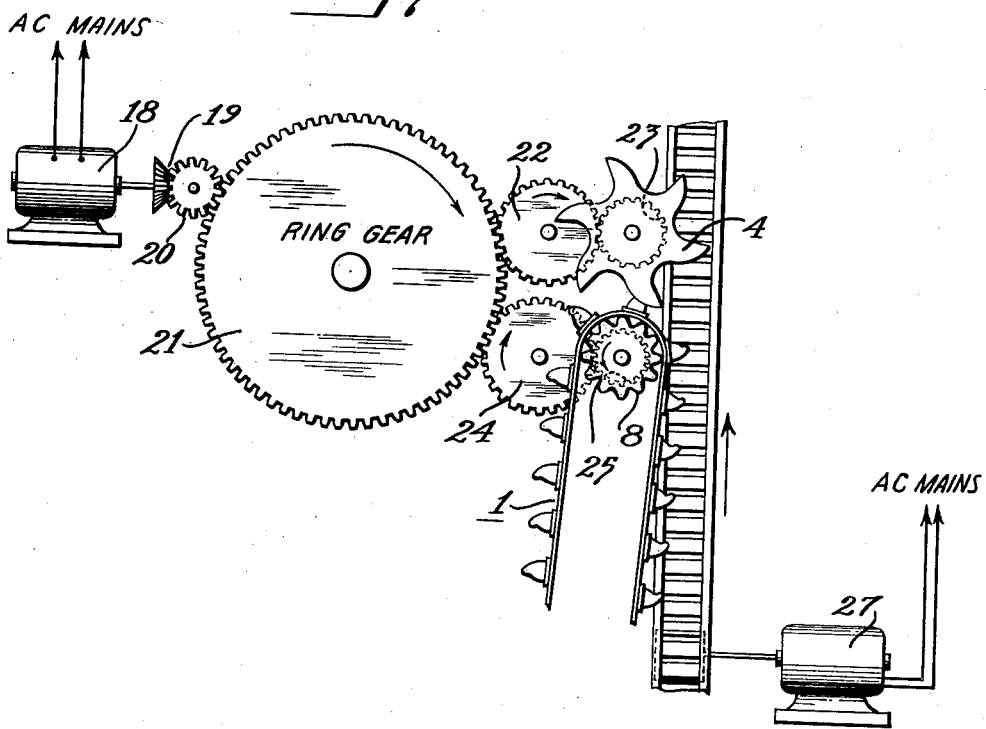
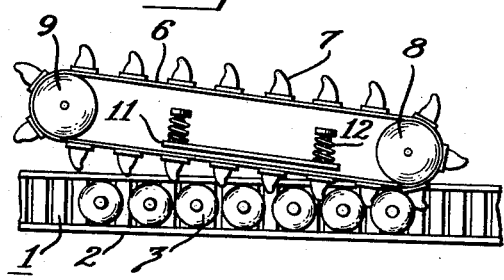
INVENTOR
Chester C. Aiken
BY
ATTORNEY Patented Apr. 3, 1951

2,547,729

UNITED STATES PATENT OFFICE 2,547,729

PACKAGE HANDLING APPARATUS

Chester Clyde Aiken, Haddonfield, N. J., assignor to Radio Corporation of America, a corporation of Delaware Application January 9, 1946, Serial No. 639,999

1 Claim. (Cl. 198—34)

This invention relates to an improvement in package handling machines and more particularly to machines and conveyors adapted to handle bottles or cans.

Bottle handling machines have been designed to perform various types of operations such as filling, mixing, labelling, capping, inspecting, etc. Associated with most of these machines there is some sort of conveying system for transferring the bottles from one point of operation to another. It is often desirable that such machines include means for taking bottles regularly or irregularly spaced on a conveyor and placing them in regularly spaced positions so that some operation such as one of those mentioned above may be performed on them. This spacing means may take the form of a starwheel, spider, or indexing disc, from which the bottles may be fed to a revolving turret having regularly spaced holders. In order to prevent the bottles from jamming as they enter the starwheel it is advantageous to have an infeed timing gate. While these devices have proved fairly satisfactory none has proven entirely foolproof against bottle jamming and all necessitate rather complicated construction to provide for proper timing.

It is an object of the present invention to provide apparatus which may be employed for taking bottles or other packages regularly or irregularly spaced on a conveyor and placing them in regularly spaced positions.

It is a further object to provide an indexing mechanism which will eliminate the use of the starwheel from package handling machines.

Another object is to provide apparatus which may be employed in eliminating the infeed timing gate in feeding packages to a starwheel.

Other objects and advantages will become apparent as the description of the invention proceeds.

Fig. 3 is a diagrammatic representation of means for driving an indexing chain, starwheel, and turret in synchronized speed relationship.

Fig. 4 is a diagrammatic view of alternate means for controlling the lateral motion of the fingers on the indexing chain.

Apparatus illustrating how the invention may be utilized will now be described.

Figure 1:
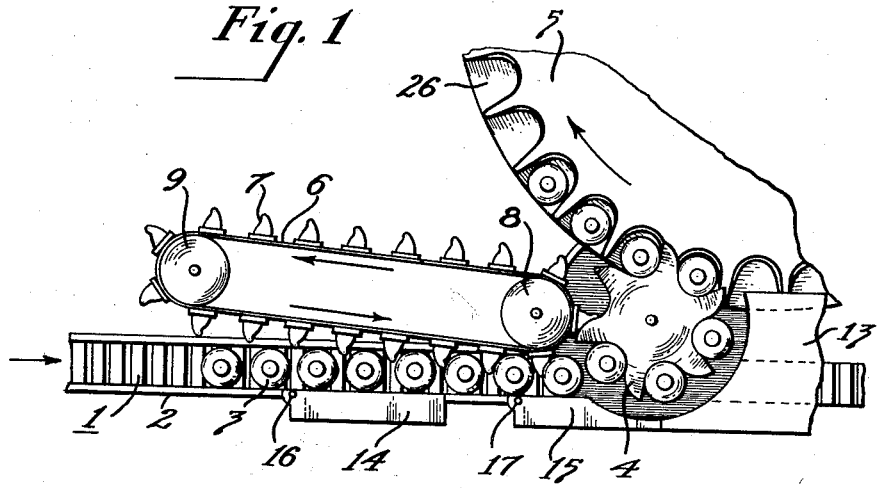
Fig. 1 is a diagrammatic representation of one form of the invention illustrating how it may be used to feed objects to a starwheel without the need of an infeed timing gate.

As illustrated in Fig. 1, conveyor 1, having edge guides 2, feeds articles 3, which may be bottles or cans, in the direction shown by the arrow. These articles may be transferred from the conveyor 1 to a rotating starwheel 4, which in turn transfers the articles to a revolving turret 5. This turret may have holders 26 spaced around its periphery and it is of course necessary that the articles be fed from starwheel to turret in properly spaced sequence so that each article may be properly positioned in a holder on the turret as each holder passes the transfer point. Suitable guides 13 are provided to confine the articles to the prescribed path.

In the prior art, the problem of feeding the articles from the conveyor to the starwheel has been a constant source of trouble since the articles often arrive on the conveyor irregularly spaced and would therefore frequently jam at the entrance to the starwheel if nothing were provided to control the entry.

In order to allow one article and only one to enter the starwheel as each pocket appears at the end of the conveyor, it has heretofore been one of the usual practices to use some sort of gate such as previously mentioned. Such devices involve complicated structures and many moving parts without being entirely foolproof. In the arrangement shown in Fig. 1, the instant invention does away with timing gates. An endless indexing chain or belt 6, carrying fingers 7, is placed adjacent the conveyor 1 such that the fingers merge with the path of motion of the conveyor and slip in between the articles 3 being carried by the conveyor. This conveyor may be driven through sprocket 8 at a speed equal to or slightly greater or less than the speed of the conveyor but preferably less. Before reaching the indexing chain, the articles are free to slip on the conveyor. As the fingers of the indexing chain move into the path of the conveyor, they will engage the articles and hold them in spaced relationship. When the motion of chain and starwheel are properly synchronized, an article will be in proper position to be transferred only when the starwheel is in proper position to receive it.

Suitable protection against jamming is provided should one or more of the fingers 7 occasionally merge with the articles such that the finger coincides with the center of the article. By allowing for a certain freedom of lateral motion of the fingers in the zone where they are merging with the path of the articles, a finger will always move off of the central point of the article and slip in between the articles in its normal position. The other provisions that the fingers be moving preferably either faster or slower than the articles on the conveyor and the dragging effect of friction when an article is pressed over against the opposite guide wall are additional assurances that the fingers will mesh properly with the articles.

As previously mentioned, the chain or band 6 is driven through sprockets 8 or 9, one of which may be an idler. Additional idler sprockets or guides such as 10 may also be included. Lateral motion of the indexing fingers may be provided for merely by allowing enough slack in chain or band 6 but if a more taut chain or band is desired, a shoe 11 held in normal position by adjustable springs 12 may be placed behind the chain or band at the zone where the fingers merge with the path of the packages. This is illustrated in Fig. 4. This modification is particularly useful where an extremely flexible chain or a band is used.

Figure 2:
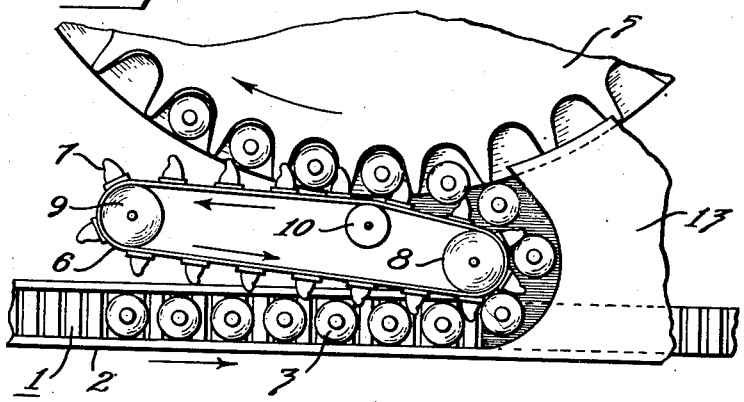
Fig. 2 is a diagrammatic representation of a form of the invention showing how it may be used to feed objects directly to a revolving turret without the aid of a starwheel.

In the embodiment of the invention illustrated in Fig. 2, the indexing band or chain is shown as eliminating the starwheel entirely thus making for still simpler construction and more trouble-free operation. As previously described, the fingers 7 slip in between objects 3 being carried on conveyor 1 and with the aid of guide member 13, the articles are transferred directly to the turret in properly spaced sequence. In this embodiment, the motions of chain and turret must also, of course, be synchronized properly. For modifying the configuration of the chain or for varying the spacing of the fingers, additional idler sprockets such as 10 may be added.

An additional safety feature which may be useful, particularly when the articles have fallen over before reaching the indexing chain, is the placing of safety gates 14 and 15 at points such as illustrated in Fig. 1 where the possibility of articles jamming is the greatest. These gates are pivoted at 16 and 17, respectively, and are adapted to swing outward when predetermined abnormal pressure is applied. As shown in the application of W. R. Du Bois, Serial No. 643,433, filed January 25, 1946, and assigned to the present assignee, safety gates 14 and 15 may be operated in conjunction with the improved latching mechanism disclosed therein and, when forced open, may actuate a microswitch which stops the conveyor mechanism when articles become jammed at these points.

Suitable arrangements for providing the necessary synchronized motion between indexing chain, starwheel, and turret are shown in Fig. 3. A ring gear 21 on turret 5 is driven by motor 18 through gears 19 and 20. Ring gear 21 then drives starwheel gear 23 and chain driving sprocket gear 25 through idlers 22 and 24, respectively. For a turret having twenty article positions 26, a six place starwheel would have to rotate twenty times for every six rotations of the turret. The relative size of starwheel and chain sprockets as well as relative spacing of teeth on the starwheel and fingers on the chain will determine the relative speeds of rotation of starwheel gear 23 and sprocket gear 25. Since the speed of conveyor 1 need only approximate the speed of indexing chain 6, it may be driven by a separate motor 27 engaging the conveyor 1 through sprocket 28.

Several modifications may be made in the design of the apparatus shown without falling outside the scope of the present invention. For example, a flexible band or belt may be used instead of a chain and chain belts may be used instead of gears. The shape of the fingers may be modified to better handle objects of other than the configuration illustrated. The indexing chain may be placed on either side of the conveyor and may approach the conveyor at almost any acute angle, but a small acute angle is preferred for the present purposes. The device may be used at any point in a package handling machine where regular spacing of the packages is needed to perform some operation on the packages. It is particularly useful for feeding either to a starwheel or directly to a turret but need not be so limited.

I claim as my invention:

A package handling apparatus comprising an endless conveyor having a predetermined path of movement, a cooperating endless indexing chain having a path of movement a portion of which intercepts the path of movement of said conveyor, said path of movement of said conveyor and said portion of said path of movement of said chain gradually merging at a small acute angle, indexing fingers mounted on said chain for indexing the packages on said conveyor, said chain having a sufficient freedom of lateral movement at the points in said paths where said fingers begin to engage said packages on said conveyor to enable said fingers to move laterally a predetermined distance sufficient to prevent jamming of said packages, a starwheel adapted to receive said packages from said conveyor, a turret adapted to receive said packages from said starwheel, means for driving said chain and said starwheel at nearly equal speeds, and means for synchronously driving said chain, said starwheel, and said turret.

CHESTER CLYDE AIKEN.

REFERENCES CITED

The following references are of record in the file of this patent:

UNITED STATES PATENTS

| Number | Name | Date |
| --- | --- | --- |
| 683,039 | Hagen | Sept 24, 1901 |
| 1,023,074 | Gaynor et al. | Apr. 9, 1912 |
| 1,118,425 | Johnson | Nov. 24, 1914 |
| 1,171,339 | Hoskins et al. | Feb. 8, 1916 |
| 1,212,754 | Fleischer | Jan. 16, 1917 |
| 1,482,197 | Kimball | Jan. 29, 1924 |
| 1,689,247 | Lange | Oct. 30, 1928 |
| 1,924,146 | Almgren | Aug. 29, 1933 |
| 2,286,523 | Whitehead | June 16, 1942 |
| 2,338,734 | Perry | Jan. 11, 1944 |